United States Patent
Rajagopalan et al.

(10) Patent No.: US 11,155,230 B2
(45) Date of Patent: Oct. 26, 2021

(54) PIVOTING CENTER DISPLAY FOR MINIMIZING AIRBAG INTERACTION

(71) Applicants: Rajkumar Rajagopalan, Troy, MI (US); Gunasekar Pillai, Troy, MI (US); Roopesh Saxena, Troy, MI (US); Karthik Chitoor, South Lyon, MI (US); Jason A Hartwell, Lake Orion, MI (US); Ravishankar Pattan, Troy, MI (US)

(72) Inventors: Rajkumar Rajagopalan, Troy, MI (US); Gunasekar Pillai, Troy, MI (US); Roopesh Saxena, Troy, MI (US); Karthik Chitoor, South Lyon, MI (US); Jason A Hartwell, Lake Orion, MI (US); Ravishankar Pattan, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 93 days.

(21) Appl. No.: 16/595,660

(22) Filed: Oct. 8, 2019

(65) Prior Publication Data
US 2021/0101554 A1    Apr. 8, 2021

(51) Int. Cl.
*B60R 21/215* (2011.01)
*B60R 21/205* (2011.01)
*B60K 37/02* (2006.01)

(52) U.S. Cl.
CPC ............ *B60R 21/215* (2013.01); *B60K 37/02* (2013.01); *B60R 21/205* (2013.01); *B60K 2370/81* (2019.05)

(58) Field of Classification Search
CPC .... B60K 37/02; B60K 37/04; B60K 2370/66; B60K 2370/67; B60K 2370/81; B60R 21/205; B60R 21/215
See application file for complete search history.

(56) References Cited

U.S. PATENT DOCUMENTS

2002/0196201 A1* 12/2002 Rosen ................ H04N 7/181
                                                              345/7
2016/0159292 A1*  6/2016 Wall ................... B60K 37/04
                                                            296/37.12
(Continued)

FOREIGN PATENT DOCUMENTS

DE    102013015534 A1 *  5/2014  ............ B60K 37/04

OTHER PUBLICATIONS

Gungor et al., Vehicle has occupant protection device that is provided with airbag which is integrated in instrument panel and covered by pivotable display unit in un-induced state, May 8, 2014, EPO, DE 10 2013 015 534 A1, English Abstract (Year: 2014).*

(Continued)

*Primary Examiner* — James A English
(74) *Attorney, Agent, or Firm* — Ralph E. Smith

(57) ABSTRACT

A system and method for deploying an airbag includes an instrument panel and an airbag assembly disposed within the instrument panel. The airbag assembly includes the airbag and a door disposed within the instrument panel. A center display screen is pivotally disposed relative to the instrument panel. The airbag assembly includes a first state wherein the door is closed and the airbag is folded and a transitional state wherein the door is opened, a least a portion of the airbag is unfolded and contacts the display to rotate the center display screen relative to the instrument panel.

18 Claims, 6 Drawing Sheets

(56) References Cited

U.S. PATENT DOCUMENTS

| | | | |
|---|---|---|---|
| 2017/0274859 A1* | 9/2017 | Heurlin | B60R 21/231 |
| 2019/0077357 A1* | 3/2019 | Rupp | B60R 21/0136 |
| 2020/0171947 A1* | 6/2020 | Derrick | G06F 3/041 |
| 2020/0384861 A1* | 12/2020 | Kadam | B60R 21/02 |

OTHER PUBLICATIONS

Gungor et al., Vehicle has occupant protection device that is provided with airbag which is integrated in instrument panel and covered by pivotable display unit in un-induced state, May 8, 2014, EPO, DE 10 2013 015 534 A1, Machine Translation of Description (Year: 2014).*

HitCar 4.3 Inch Small Mini Flip Down Foldable Monitor Jul. 29, 2019—www.amazon.com/Digital-Foldable-Monitor-Vehicle-HitCar/dp/B01LYFXFZ1 (8 pages).

* cited by examiner

PIVOTING CENTER DISPLAY FOR MINIMIZING AIRBAG INTERACTION

TECHNICAL FIELD

The present disclosure relates generally to a center mount display for a vehicle and, more specifically, to a method and system for deploying an airbag to reduce interaction between an airbag during deployment and a center mount display.

BACKGROUND

The statements in this section merely provide background information related to the present disclosure and does not constitute prior art.

Interior vehicle design is ever changing. More modern designs include touch screens that are used for various functions including entertainment and vehicle controls. Safety is also an important feature of a vehicle. Commonly, airbags are incorporated into the instrument panel as an occupant restraint.

A center display is commonly used as a touch screen display in a vehicle. The center touch screen display is fixed to the instrument panel within the vehicle operators reach between the driver side and passenger side. A center display is rather large and conflict with the positioning of an airbag. Center displays are located in a lower position to prevent interaction with the airbag. However, a higher center display is desired for easier user access and visibility.

SUMMARY

The present disclosure provides a center display screen that rotates out of the way of an airbag in response to the deployment of the airbag. That is, with the hinged center display screen, the airbag deployment is not hindered and it allows the proper positioning of the airbag to the occupant in a crash event. Without, the hinged center display screen, the airbag deployment could get skewed and may not result in a proper position for the occupant in a crash event.

In one aspect of the disclosure, a system for deploying an airbag includes an instrument panel and an airbag assembly disposed within the instrument panel. The airbag assembly includes the airbag and a door disposed within the instrument panel. A center display screen is pivotally disposed relative to the instrument panel. The airbag assembly includes a first state wherein the door is closed and the airbag is folded and a transitional state wherein the door is opened, a least a portion of the airbag is unfolded and contacts the display to rotate the center display screen relative to the instrument panel.

In a further aspect of the disclosure, a method of deploying an airbag comprises initiating deployment of an airbag assembly, said airbag assembly comprising the airbag and a door, opening the door of the airbag assembly by deploying the airbag therethrough, contacting a center display screen with a portion of the airbag assembly and rotating the center display screen relative to an instrument panel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6C is a side view of the airbag in a fully deployed position relative to the center screen display.

DETAILED DESCRIPTION

Examples will now be described more fully with reference to the accompanying drawings. The examples disclosed below are not intended to be exhaustive or to limit the disclosure to the precise forms disclosed in the following detailed description. Rather, the examples are chosen and described to allow others skilled in the art to utilize their teachings.

The following description is set forth for a vehicle. Various terms such as above, below, in front, behind, inside and outside are provided with reference to the vehicle being disposed on a level surface and relative to an operator position. The term width refers to a dimension lateral to the vehicle perpendicular to the longitudinal axis and the normal direction of travel.

Figure 1:
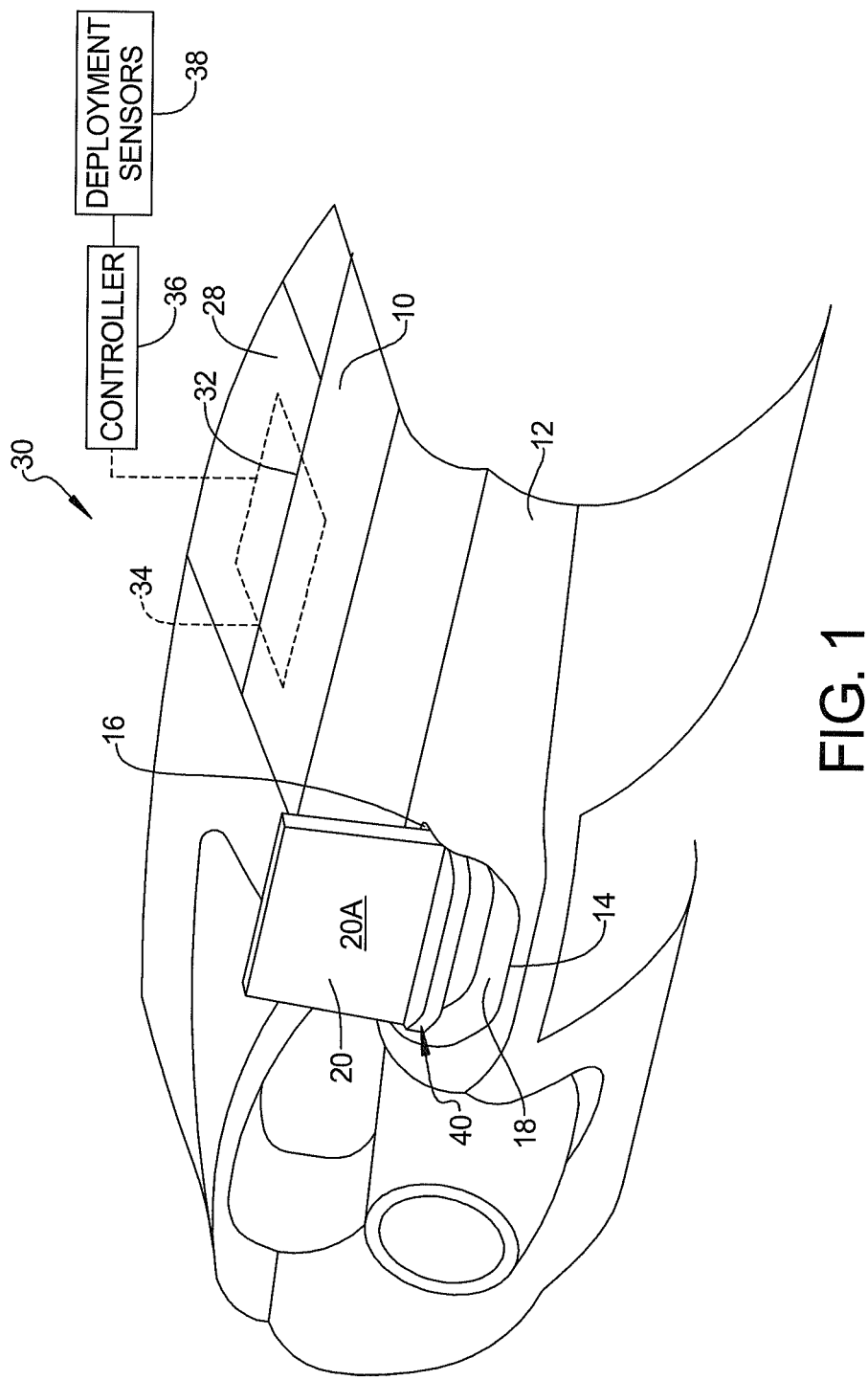
FIG. 1 is a perspective view of an instrument panel for a vehicle having an airbag assembly formed according to the present disclosure.

Referring now to FIG. 1, an instrument panel 10 has a rearward-facing surface 12 disposed thereon. The rearward-facing surface 12 is in front of the driver and passenger position and has a recess 14. The recess 14 has an upper portion 16 and a lower portion 18. The upper portion 16 is used for mounting a center display screen 20 and also has a rearward facing surface 20A and a forward facing surface 20B (illustrated below). The center display screen 20 is pivotally mounted to the upper portion 16 of the recess 14 as will be described in more detail below. The center display screen 20 is a touch screen display and is positioned to pivot or rotate forward but not rearward.

The instrument panel 10 also includes an upper surface 28. The upper surface 28 is used for concealing an airbag assembly 30 therein. The airbag assembly 30 includes a door 32 and an airbag 34.

The vehicle includes a controller 36 and a plurality of deployment sensors 38 that are used to activate or cause the deployment of the airbag 34. The deployment sensors 38 includes but are not limited to camera-based sensors, accelerometer-based sensors, speed sensors and combinations thereof. The controller 36 is a microprocessor-based controller that is programmed to perform steps to deploy the airbag based on the conditions sensed at the deployment sensors 38.

The door 32 opens in response to the deployment of the airbag 34 as is described in more detail below. In the illustration of FIG. 1, the airbag 34 is in a folded position and when inflated or deployed unfolds.

The center display screen 20 has a pivot mechanism 40 that is used to couple the instrument panel to the center display screen 20 within the recess 14. Details of the pivot mechanism 40 are described in more detail below.

Figure 2A:
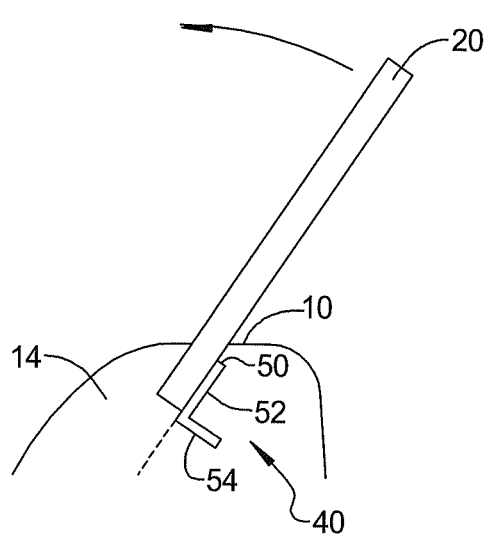
FIGS. 2A and 2B are respective side and front views of a screen display having a first pivot mechanism.
Figure 2B:
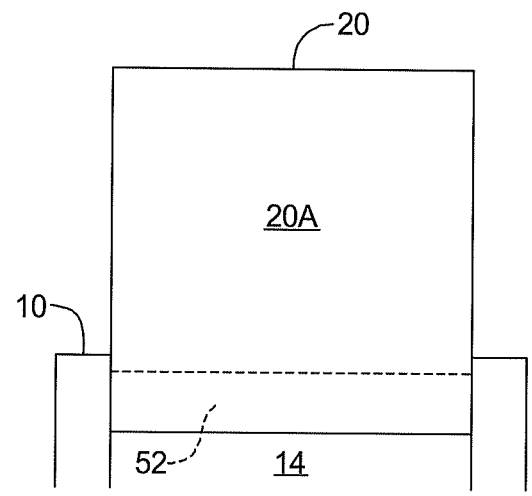

Referring now to FIGS. 2A and 2B, the center display screen 20 is illustrated having a first example of a pivot mechanism 40. The pivot mechanism 40 in this example comprises a hinge 50. The hinge 50 has a first elongated member 52 that is mounted to a front facing surface of the center display screen 20. A second elongated member 54 is mounted within the recess 14 to the instrument panel 10. Various fasteners are used to fasten the first elongated member 52 to the second elongated member 54 to their respective components. The hinge 50 is manufactured with a movement force or resistance that allows the hinge 50 to move when contacted by the deploying airbag 34. The hinge 50 has resistance that prevents the center display screen 20 from moving during normal vehicle operation such as under an acceleration condition but not large enough to inhibit the deployment of the airbag 34.

Figure 3A:
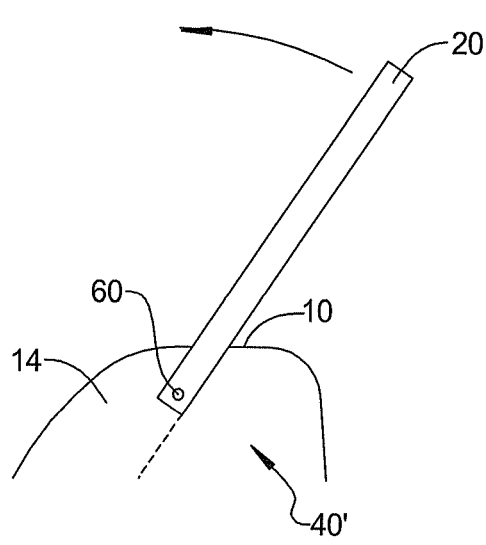
FIGS. 3A and 3B are respective side and front views of a screen display having a second pivot mechanism.
Figure 3B:
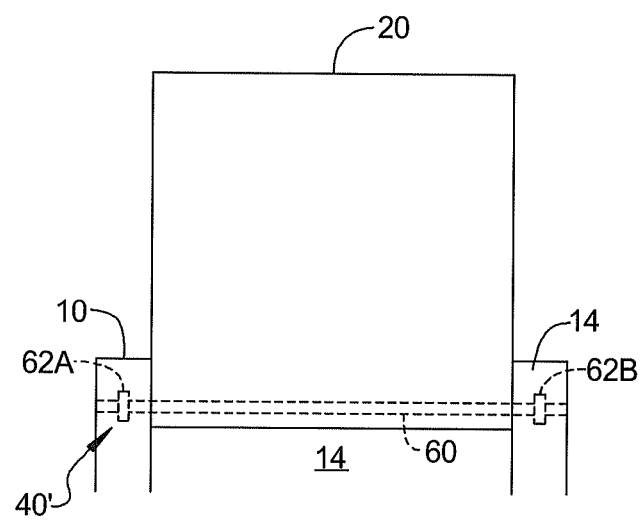

Referring now to the FIGS. 3A and 3B, the instrument panel 10 and center display screen 20 has a pivot mechanism 40' as an alternate to the hinge 50 as the pivot mechanism 40 described in FIGS. 2A and 2B.

In this example, the pivot mechanism 40' includes a pin 60 and a first pin receiver 62A and a second pin receiver 62B. The first pin receiver 62A and the second pin receiver 62B are mounted to the structure of the instrument panel 10. The pin 60 is received in an opening of the pin receivers 62A, 62B to pivotally mount the center display screen 20 thereon. The center display screen 20 pivots about the pin 60 into the recess 14.

Figure 4A:
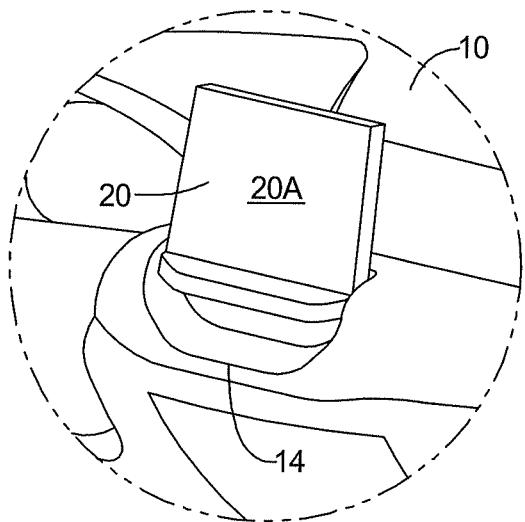
FIG. 4A is a perspective view of the screen display in an upright position.
Figure 4B:
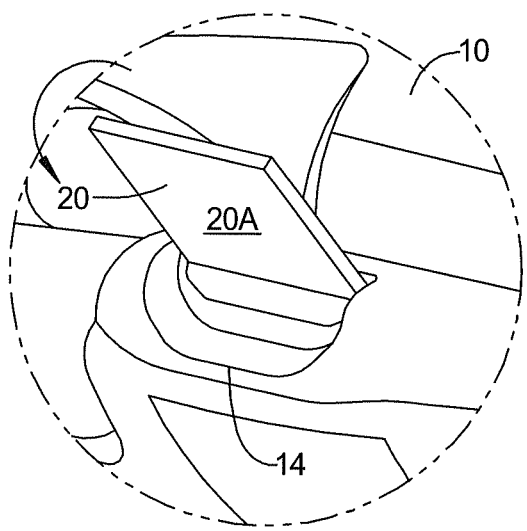
FIG. 4B is a perspective view of the screen display in a partially rotated position.
Figure 4C:
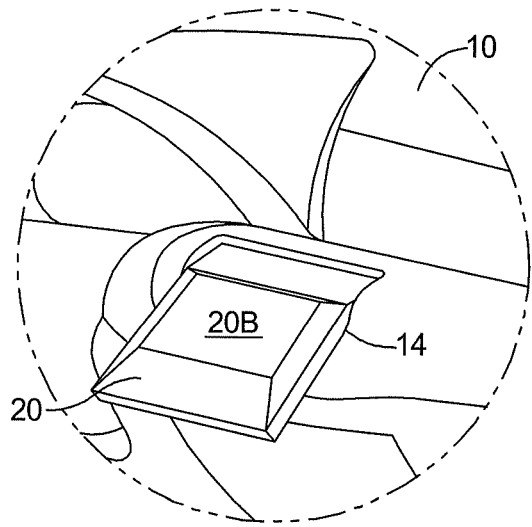
FIG. 4C is a screen display in a fully pivoted position.

Referring now to FIGS. 4A-4C, the center display screen 20 is illustrated in various positions. In the normal operating position illustrated in FIG. 4A, the center display screen 20 is in an upright position. In FIG. 4B, the center display screen 20 is illustrated in a partially deployed position. This position will be attained when the airbag 34 pushes against the rear surface 20B of the center display screen 20. In FIG. 4C, the center display screen 20 is pivoted into the recess 14 to allow the airbag to provide occupant protection.

Figure 5A:
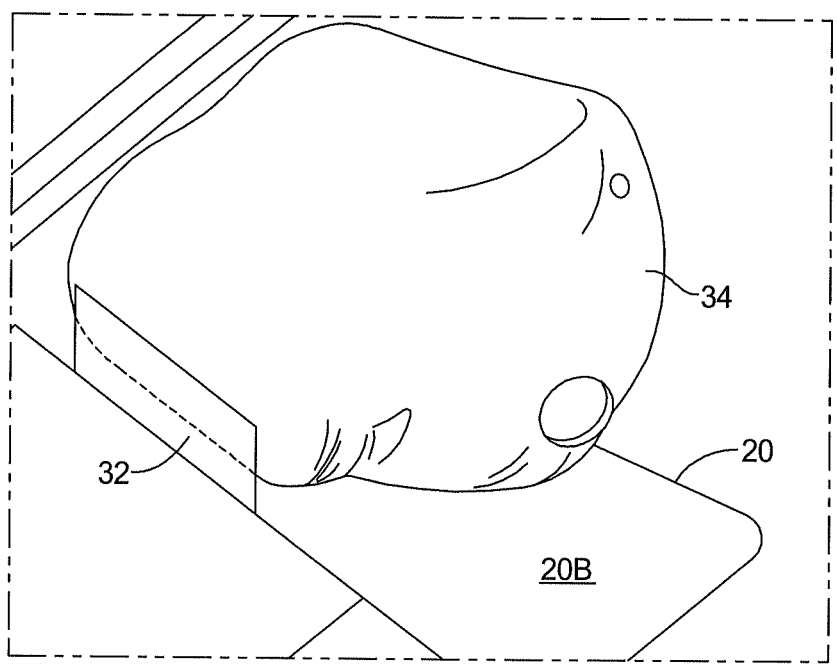
FIG. 5A is a screen display displaced by a fully deploying airbag.
Figure 5B:
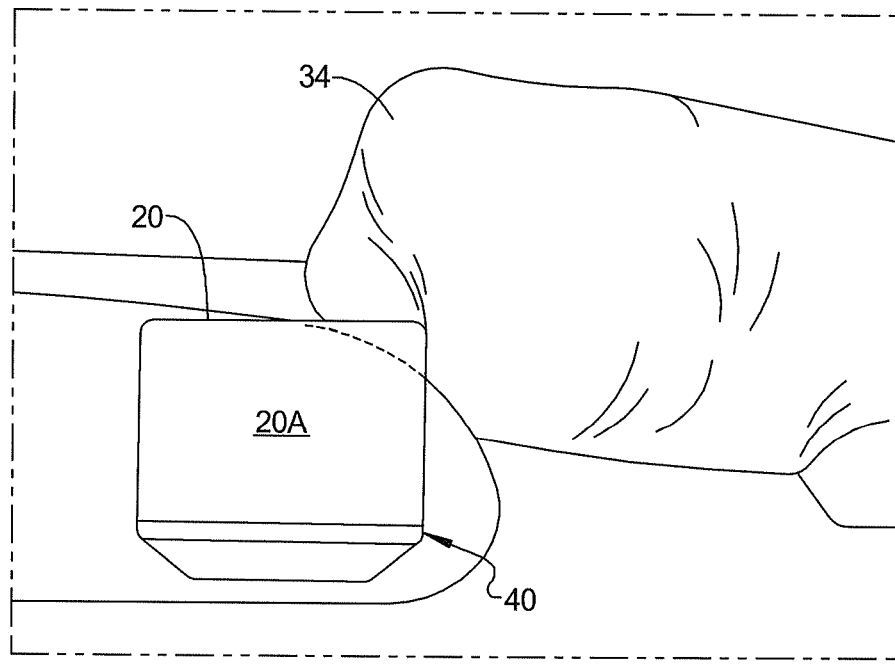
FIG. 5B is a screen display illustrated relative to a deploying airbag.

Referring now to FIGS. 5A and 5B, a deployed airbag 34 is illustrated from various perspectives. FIG. 5A is a top view of the airbag 34 and the airbag door 32 with the airbag 34 extending therefrom. The airbag 34 is in a transitional state and has begun to fold the center display screen 20 into a folded position. In this example a corner portion of the airbag 34 contacts a portion of the center display screen 20 with sufficient force to overcome the resistance of the pivot mechanism 40 to rotate the center display screen 20 into a position such as that illustrated in FIG. 4C.

Figure 6A:
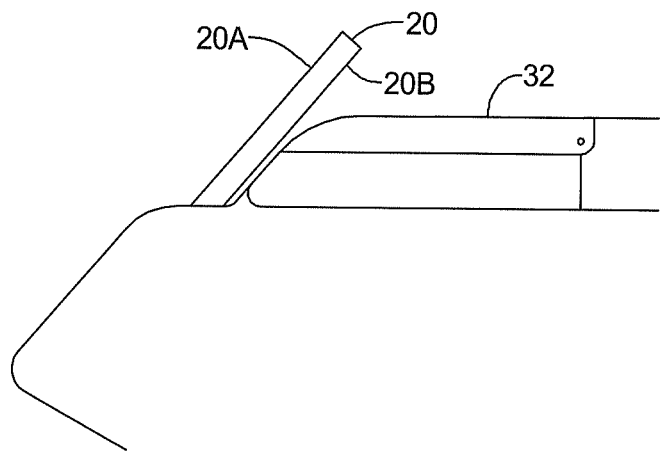
FIG. 6A is a side view of an airbag assembly.
Figure 6B:
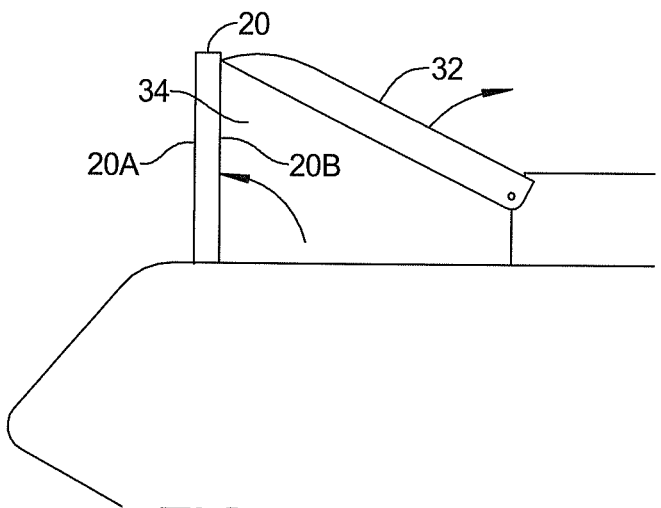
FIG. 6B is a side view of a door of the airbag assembly contacting the center display screen.
Figure 6C:
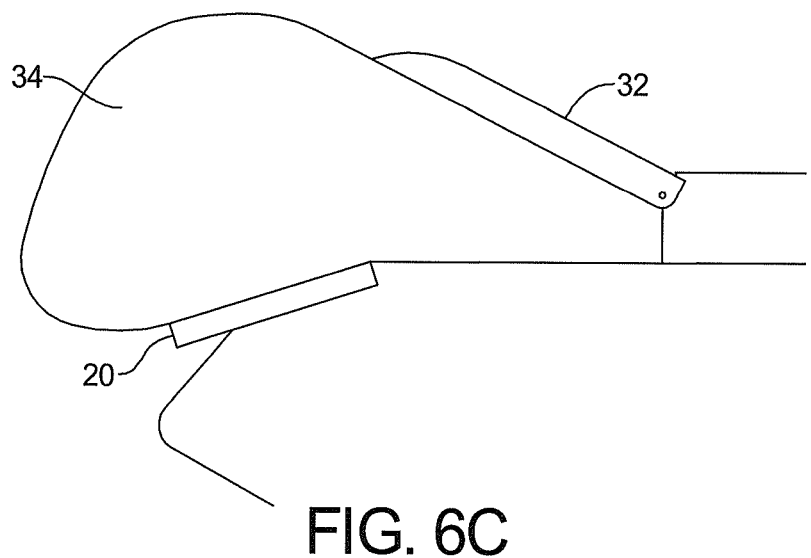
FIG. 6C is a side view of the airbag beginning to deploy.

Referring now to FIGS. 6A-6C, an alternate example is set forth. In this example, the door 32 contacts the center display screen 20 to provide some rotational force thereupon. The door 32 alone or the door in combination with the airbag 34 is used in this example to rotate the center display screen 20.

Figure 7:
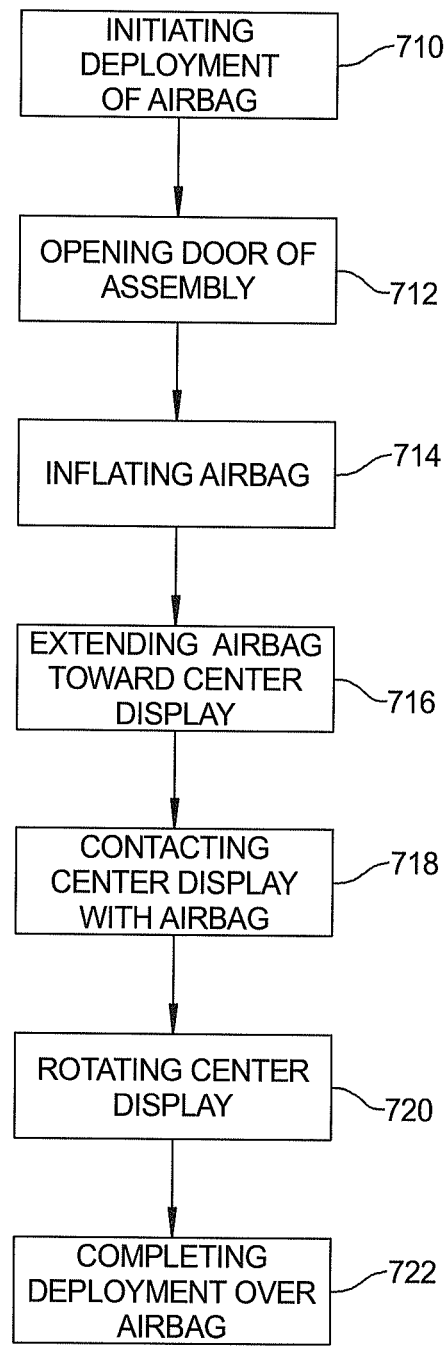
FIG. 7 is a flow chart of a method for deploying the airbag relative to the center screen display.

Referring now to FIG. 7, a method for operating the airbag assembly is set forth. In this example, the deployment of the airbag is initiated in step 710. Initiation of the deployment of the airbag 34 is performed in response to the deployment sensors described above. Once a deployment condition is sensed, the controller 36 described initiates the deployment of the airbag. In steps 712 and 714, the door assembly opens while the airbag is inflating. The door is opened by the inflation of the airbag 714. In step 716, the airbag is extended toward the center display.

In step 718, a forward facing surface 20B of the center display screen 20 is contacted with a portion of the airbag. In the above example, the corner of the airbag contacts the front-facing surface 20B of the center display screen 20. In step 720, the center display screen 20 is rotated rearward in the vehicle. In step 722, the airbag completes deployment and rotates the center screen display into a downward position as illustrated by FIG. 4C. The airbag deploys over the center display screen 20 to provide full occupant protection to the extent of the airbag.

Those skilled in the art will now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

The invention claimed is:

1. A system for deploying an airbag comprising:
an instrument panel;
an airbag assembly disposed within the instrument panel, said airbag assembly comprising the airbag and a door disposed within the instrument panel; and
a center display screen pivotally disposed relative to the instrument panel, said airbag assembly comprising a first state wherein the door is closed and the airbag is folded and a transitional state wherein the door is opened, a least a portion of the airbag is unfolded and contacts the center display screen to rotate the center display screen relative to the instrument panel,
wherein the door contacts the center display screen upon deployment.

2. The system as recited in claim 1 wherein the center display screen is coupled to the instrument panel with a pivot mechanism.

3. The system as recited in claim 1 wherein a corner of the airbag contacts the center display screen.

4. The system as recited in claim 1 further comprising a hinge coupling the center display screen and the instrument panel.

5. The system as recited in claim 4 wherein the hinge is disposed within a recess of the instrument panel.

6. The system as recited in claim 1 wherein the door is disposed on an upper surface of the instrument panel.

7. The system as recited in claim 1 wherein the instrument panel comprises a recess, said center display screen rotating at least partially into the recess when the airbag is unfolded in a final state.

8. The system as recited in claim 7 wherein the recess comprises an upper portion and a lower portion, said upper portion receiving a pivot mechanism that couples the center display screen within the recess.

9. The system as recited in claim 8 wherein the center display screen is rotatably coupled to an upper portion of the recess.

10. The system as recited in claim 7 wherein at least a portion of the recess is disposed in a rearward facing surface of the instrument panel.

11. A method of deploying an airbag comprising:
initiating deployment of an airbag assembly, said airbag assembly comprising the airbag and a door;

opening the door of the airbag assembly by deploying the airbag therethrough;

contacting a center display screen with a portion of the airbag assembly; and rotating the center display screen relative to an instrument panel, wherein contacting the center display screen comprises contacting the center display screen with the door of the airbag assembly.

12. The method of claim 11 wherein opening comprises opening the door by inflating the airbag.

13. The method of claim 11 wherein opening comprises opening the door in a top surface of the instrument panel by inflating the airbag.

14. The method of claim 11 wherein contacting the center display screen comprises contacting the center display screen with the airbag.

15. The method of claim 11 wherein contacting the center display screen comprises contacting a front facing surface of the center display screen with a corner of the airbag.

16. The method of claim 11 wherein contacting the center display screen comprises contacting the center display screen with the door of the airbag assembly and the airbag.

17. The method of claim 11 wherein rotating the center display screen comprises rotating the center display screen to a downward position.

18. The method of claim 11 wherein rotating the center display screen comprises rotating the center display screen to a downward position with a recess in the instrument panel that is rear facing.

* * * * *